US008108586B2

(12) United States Patent
Sakugawa

(10) Patent No.: US 8,108,586 B2
(45) **Date of Patent: *Jan. 31, 2012**

(54) MULTI-CORE DATA PROCESSOR

(75) Inventor: Mamoru Sakugawa, Tokyo (JP)

(73) Assignee: Renesas Electronics Corporation, Kawasaki-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/985,227

(22) Filed: Jan. 5, 2011

(65) Prior Publication Data

US 2011/0099303 A1 Apr. 28, 2011

Related U.S. Application Data

(63) Continuation of application No. 12/366,718, filed on Feb. 6, 2009, now Pat. No. 7,890,685.

(51) Int. Cl.
*G06F 13/26* (2006.01)

(52) U.S. Cl. ........ 710/317; 710/200; 710/240; 710/117; 710/305

(58) Field of Classification Search .......... 710/316–317, 710/305–306, 240–244, 200, 117
See application file for complete search history.

(56) References Cited

U.S. PATENT DOCUMENTS 6,078,976 A * 6/2000 Obayashi ...................... 710/315
6,701,407 B1 3/2004 Honjo et al.

FOREIGN PATENT DOCUMENTS

JP 2001-167067 A 6/2001

* cited by examiner

*Primary Examiner* — Mark Rinehart
*Assistant Examiner* — Kim Huynh
(74) *Attorney, Agent, or Firm* — Miles & Stockbridge, P.C.

(57) ABSTRACT

To provide a multi-core LSI capable of improving the stability of operation. A multi-core LSI comprises a plurality of CPUs coupled to a first shared bus, one or more modules coupled to a second shared bus, a shared bus controller coupled between the first shared bus and the second shared bus, for arbitrating an access to the module (s) by the CPUs, and a system controller that monitors whether or not a response signal to an access request signal of the CPUs is output from module to be accessed, wherein the system controller outputs a pseudo response signal to the first shared bus via the shared bus controller to terminate the access by the CPU while accessing if the response signal is not output from the module to be accessed after the access request signal is output to the second shared bus from the shared bus controller and before a predetermined time elapses.

4 Claims, 9 Drawing Sheets

MULTI-CORE LSI
1
Debug
CPU #0
CPU #1
NMI
DBI
INT
PRIMARY CACHE
L1
db
DBI#0
DBI#1
b1
SECONDARY CACHE
L2
SHARED BUS CONTROLLER
3
SYSTEM CONTROLLER (SYSC)
9
RESPONSE SIGNAL
12
11a
11
b2
MODULE m1
MODULE mn
EXTERNAL BUS CONTROLLER
5
INTERRUPT CONTROLLER (INTC)
7
EXTERNAL DEVICE
gb1
gb2
gb
TERMINATION REQUEST SIGNAL SHARED BUS CONTROLLER
3
INTERRUPT CONTROLLER
7
11
RESPONSE SIGNAL INPUT
12
PSEUDO RESPONSE SIGNAL OUTPUT
NMI
INT
DBI
9f
9
SYSTEM CONTROLLER
COUNTER
COUNTER UNDERFLOW
START
CONTROLLER
9g
b2
q1
q2
q3
q4
9a
9b
9c
9d
9e
ADDRESS REGISTER
COMMAND REGISTER
CPUID REGISTER
INTERRUPT CONTROL REGISTER (CPU#0)
INTERRUPT CONTROL REGISTER (CPU#1)
CPU#0-NMI
CPU#1-NMI
CPU#0-INT
CPU#1-INT
CPU#0-DBI
CPU#1-DBI

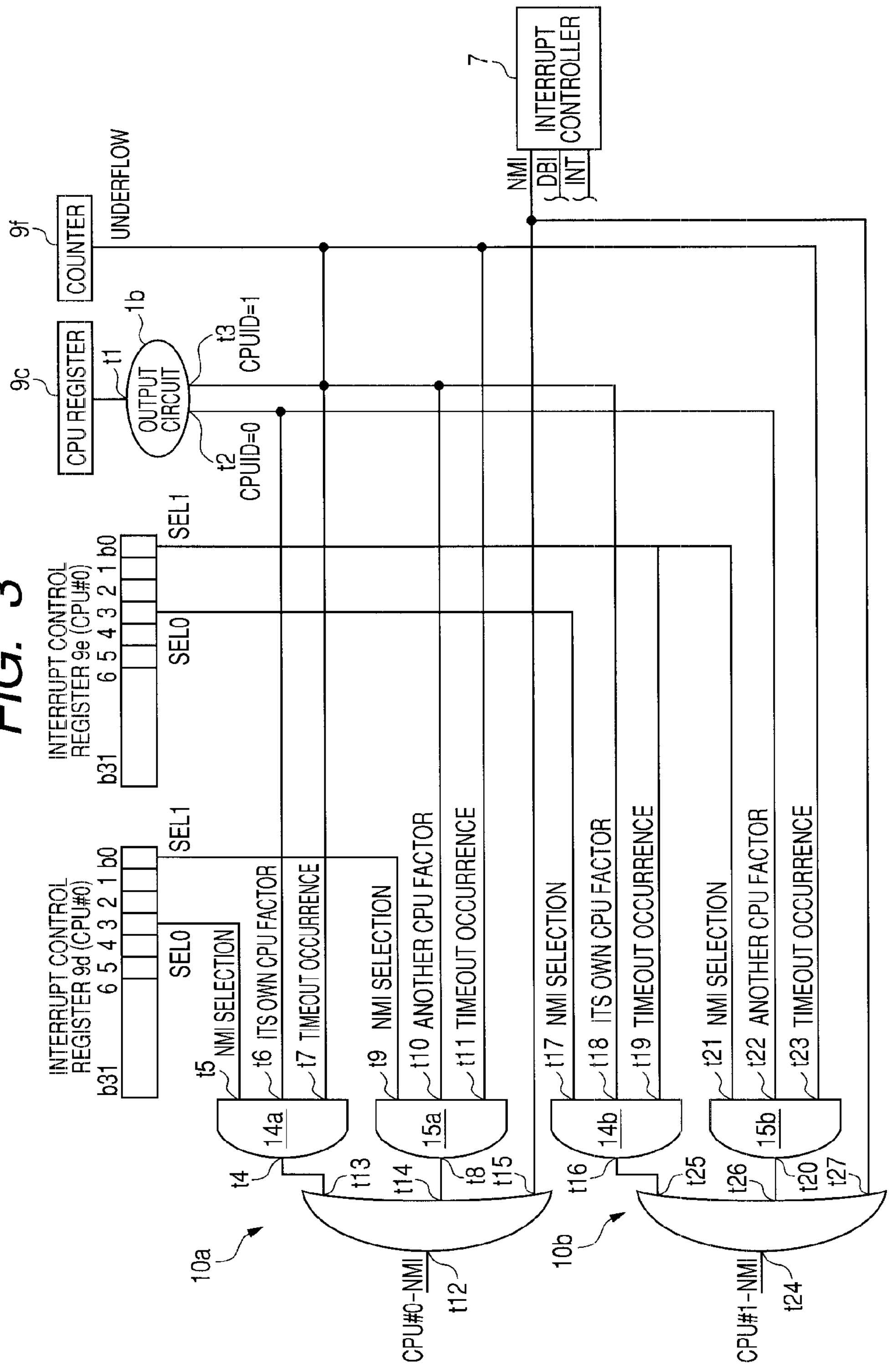
FIG. 3
INTERRUPT CONTROL REGISTER 9d (CPU#0)
INTERRUPT CONTROL REGISTER 9e (CPU#0)
b31
6 5 4 3 2 1 b0
SEL0
SEL1
CPU REGISTER
9c
t1
OUTPUT CIRCUIT
1b
t2
CPUID=0
t3
CPUID=1
COUNTER
9f
UNDERFLOW
7
INTERRUPT CONTROLLER
NMI
DBI
INT
t5 NMI SELECTION
t6 ITS OWN CPU FACTOR
t7 TIMEOUT OCCURRENCE
t9 NMI SELECTION
t10 ANOTHER CPU FACTOR
t11 TIMEOUT OCCURRENCE
t17 NMI SELECTION
t18 ITS OWN CPU FACTOR
t19 TIMEOUT OCCURRENCE
t21 NMI SELECTION
t22 ANOTHER CPU FACTOR
t23 TIMEOUT OCCURRENCE
14a
15a
14b
15b
t4
t13
t14
t8
t15
t16
t25
t26
t20
t27
10a
10b
CPU#0-NMI
t12
CPU#1-NMI
t24

FIG. 4

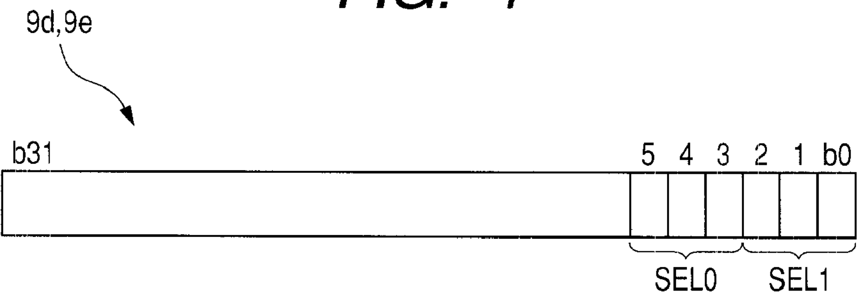

| B | BIT NAME | FUNCTION | R | W |
|---|---|---|---|---|
| 31-6 | 0 FIXED | | 0 | 0 |
| 5-3 | SEL0 | 000: TIMEOUT INTERRUPT IS NOT GENERATED<br>001: NMI IS GENERATED FOR TIMEOUT DUE TO ITS OWN CPU<br>010: INT IS GENERATED FOR TIMEOUT DUE TO ITS OWN CPU<br>100: DBI IS GENERATED FOR TIMEOUT DUE TO ITS OWN CPU | R | W |
| 2-0 | SEL1 | 000: TIMEOUT INTERRUPT IS NOT GENERATED<br>001: NMI IS GENERATED FOR TIMEOUT DUE TO ANOTHER CPU<br>010: INT IS GENERATED FOR TIMEOUT DUE TO ANOTHER CPU<br>100: DBI IS GENERATED FOR TIMEOUT DUE TO ANOTHER CPU | R | W |

FIG. 5

| | INTERRUPT CONTROL REGISTER 9d (CPU#0) | | INTERRUPT CONTROL REGISTER 9e (CPU#0) | |
|---|---|---|---|---|
| | b5~b3 (SEL0) | b2~b0 (SEL1) | b5~b3 (SEL0) | b2~b0 (SEL1) |
| MODE 1 (NMI IS GENERATED UPON UNAUTHORIZED ACCESS OF ITS OWN CPU) | 001 | 000 | 001 | 000 |
| MODE 2 (MASKABLE INTERRUPT IS GENERATED UPON UNAUTHORIZED ACCESS OF ITS OWN CPU) | 010 | 000 | 010 | 000 |
| MODE 3 (DEBUG INTERRUPT IS GENERATED UPON UNAUTHORIZED ACCESS OF ITS OWN CPU) | 100 | 000 | 100 | 000 |
| MODE 4 (NMI IS ALWAYS GENERATED UPON UNAUTHORIZED ACCESS) | 001 | 001 | 001 | 001 |
| MODE 5 (MASKABLE INTERRUPT IS ALWAYS GENERATED UPON UNAUTHORIZED ACCESS) | 010 | 010 | 010 | 010 |
| MODE 6 (DEBUG INTERRUPT IS GENERATED UPON UNAUTHORIZED ACCESS) | 100 | 100 | 100 | 100 |
| MODE 7 (NMI IS GENERATED UPON UNAUTHORIZED ACCESS OF ITS OWN CPU AND MASKABLE INTERRUPT IS GENERATED UPON UNAUTHORIZED ACCESS OF ANOTHER CPU) | 001 | 010 | 001 | 010 |
| MODE 7 (DEBUG INTERRUPT IS GENERATED UPON UNAUTHORIZED ACCESS OF ITS OWN CPU AND MASKABLE INTERRUPT IS GENERATED UPON UNAUTHORIZED ACCESS OF ANOTHER CPU) | 100 | 010 | 100 | 010 |

CPU#0
COMMAND
ADDRESS
CPU#0
COMMAND
ADDRESS
SHARED BUS
CPUID
COMMAND
ADDRESS
MODULE OF ACCESS DESTINATION
SAVED DATA
RESPONSE
Read
AA
Write
AC
Write
AB
Read
AD
T1
0
1
0
Read
Write
Write
AA
AB
AC
T2
T3
T4
DA
DB
DC
r1
r2
r3
TIME AXIS UPON NORMAL OPERATION
CPU#0
CPU#1
SHARED BUS
b1,b2
TIME AXIS
A
B
C
D WHEN BUS TIMEOUT OCCURS
TRANSACTION THAT
CAUSES BUS TIMEOUT
CPU#0
CPU#1
SHARED BUS
b1,b2
TIME AXIS
A
B
C
D SHARED BUS b2
ADDRESS
COMMAND
CPUID
RESPONSE SIGNAL INPUT TO SYSTEM CONTROLLER 9
PSEUDO RESPONSE SIGNAL OUTPUT
COUNTER
START COUNTER TIMING
TERMINATE COUNTER TIMING (END OF TIMING)
INTERRUPT PROCESSING REQUEST SIGNAL
ADDRESS REGISTER 9a
COMMAND REGISTER 9b
CPUID REGISTER 9c
IDLE
AA
RD
0
AB
WR
1
AC
S1
S2
S3
S4
S5
S6
S7
S8
S9
S10
S11

MULTI-CORE DATA PROCESSOR

CROSS-REFERENCE TO RELATED APPLICATIONS

This application is a continuation of application Ser. No. 12/366,718 filed Feb. 6, 2009 now U.S. Pat. No. 7,890,685. The present application also claims priority from Japanese Patent Application No. 2008-33030 filed on Feb. 14, 2008, the content of which is hereby incorporated by reference into this application.

BACKGROUND OF THE INVENTION

The present invention relates to a multi-core LSI (multi-core data processor) on which a plurality of CPUs is mounted over the same LSI.

In a multi-core LSI over which the CPUs are mounted on the same LSI, when the CPUs are debugging software that runs independently of each another, if a shared bus has hung up because a program runs out of control (access to an unintended region etc.), it is not possible to identify which access by which CPU has caused the hang up and debugging of software becomes difficult to perform.

The case where a certain CPU runs out of control to cause a shared bus to hang up while other CPUs are running normally corresponds to the above case. In this case, due to the hang up of the shared bus, not only the CPU to be debugged but also other normal CPUs can no longer access and come to a stop. Consequently, it has been impossible to effectively debug software in a multi-core LSI even using a debug technique for a single-core LSI (LSI mounting one CPU).

As a technique for debugging in a single-core LSI, the following (1) and (2) are known.

(1) A system controller monitors a shared bus and if the access does not terminate after a predetermined time elapses (that is, a CPU runs out of control), the system controller detects it, outputs a pseudo response signal to the shared bus, and terminate the access by the CPU while accessing, and at the same time, causing the CPU to execute an interrupt processing. After that, the operation of the CPU is analyzed and which CPU has run out of control at which point in the program is identified by checking at which point in the program the interrupt processing has been processed (prior art 1).

(2) A WDT (Watch Dog Timer) is known as a function to detect a timeout for a fixed processing period of time among processing of software. In this case, at which point the CPU has run out of control is identified by detecting a timeout using a WDT and causing the CPU to execute an interrupt processing (prior art 2).

As a prior art document about the detection of timeout, patent document 1 (Japanese patent laid-open No. 2001-167067) is known.

SUMMARY OF THE INVENTION

When the above-mentioned prior art 1 is extended to a multi-core LSI, the current situations are such that there is no effective technique how to output an interrupt request signal to each CPU and how to identify which access by which CPU has caused a hang up.

When the above-mentioned prior art 2 is used for a multi-core LSI, if the shared bus itself has hung up and an attempt is made to detect the hang up using the WDT and cause the other normal CPUs to execute an interrupt processing, it is not possible for the normal CPU to execute the interrupt processing unless the CPU to be debugged releases the bus right.

As described above, conventionally, even if a hang up occurs in a shared bus in a multi-core LSI, it is not possible to identify which access by which CPU has caused the hang up, and there has been a problem that the efficiency of program development is poor.

If a certain CPU has run out of control and caused a shared bus to hang up, the other normal CPUs can no longer access and come to a stop, and therefore, there has also been a problem that the stability of operation of an LSI is poor.

The present invention has been developed in order to solve the above problems and a first object thereof is to provide a multi-core LSI capable of improving the stability of operation and a second object thereof is to provide a multi-core LSI capable of improving the efficiency of program development.

In order to solve the above problems, a multi-core LSI according to a first aspect of the present invention comprises: a plurality of CPUs coupled to a first shared bus; one or more modules coupled to a second shared bus; a shared bus controller coupled between the first shared bus and the second shared bus, for arbitrating an access to the module(s) by the CPUs; and a system controller that monitors whether or not a response signal to an access request signal of the CPU is output from the module to be accessed, wherein the system controller outputs a pseudo response signal to the first shared bus via the shared bus controller to terminate the access by the CPU while accessing if the response signal is not output from the module to be accessed after the access request signal is output to the second shared bus from the shared bus controller and before a predetermined time elapses.

According to the first aspect of the present invention, the system controller outputs a pseudo response signal to the first shared bus via the shared bus controller to terminate the access by the CPU while accessing if the response signal is not output from the module to be accessed after the access request signal is output to the second shared bus from the shared bus controller and before a predetermined time elapses. Consequently, even when the response signal is not output from the module to be accessed because of the occurrence of a bug etc., it is possible to prevent the multi-core LSI from stopping when the CPU while accessing occupies the shared bus for a long period of time, and thus, the stability of operation of the multi-core LSI can be improved.

BRIEF DESCRIPTION OF THE DRAWINGS

FIG. 3 is a schematic configuration diagram of a logic circuit at a part that outputs a non-maskable interrupt request signal of a controller 9*g* in FIG. 2.

FIG. 4 is a diagram for explaining the specifications of interrupt control registers 9*d* and 9*e* in FIG. 2.

FIG. 5 is a diagram for explaining an example of setting data to be set to the interrupt control registers 9*d* and 9*e* in FIG. 2.

DETAILED DESCRIPTION OF THE PREFERRED EMBODIMENTS

First Embodiment

General Configuration

Figure 1:
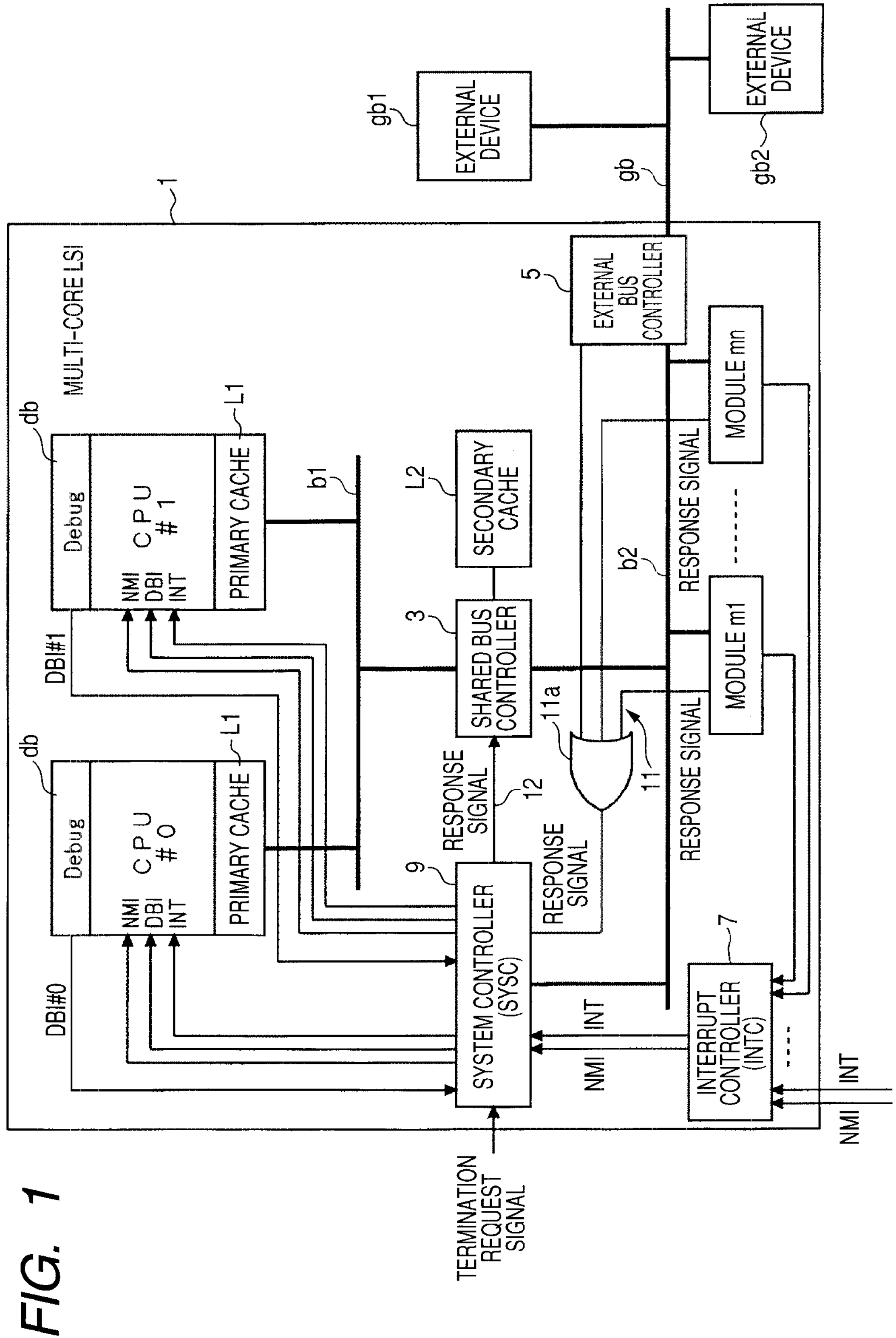
FIG. 1 is a configuration diagram of a multi-core LSI according to a first embodiment.

A multi-core LSI 1 according to a first embodiment comprises, as shown in FIG. 1, a plurality of CPUs (for example, two), that is, a CPU #0 and a CPU #1, a shared bus controller 3 that arbitrates the access by each of the CPUs #0 and #1, a shared bus b1 to which the respective components #0, #1, and 3 are coupled, one or more (for example, n) modules m1 to mn, such as a ROM and RAM, an external bus controller 5 that is an interface with an external bus gb, an interrupt controller 7 that causes each of the CPUs #0 and #1 to execute an interrupt processing, a shared bus b2 to which the respective components m1 to mn, 3, and 5 are coupled, and a system controller 9 that monitors the shared bus b2.

Each of the shared buses b1 and b2 is made up of an address bus through which the address of an access destination is transmitted, a command bus through which a command (for example, read, write, response signal, etc.) is transmitted, a data bus through which data is transmitted, and a CPUID bus through which the ID of the CPU #0 or #1 of an access source is transmitted.

Each of the CPUs #0 and #1 is a general one and comprises a debug function db, a primary cache L1, and various interrupt request signals, such as an NMI (non-maskable interrupt), an INT (maskable interrupt), and a DBI (debug interrupt), from the system controller 9.

The debug function db is a general one that communicates with an external device to implement functions necessary to debug programs, such as execution control of programs of the CPUs #0 and #1, breakpoint control, display of a register within the CPU, and a function to output an execution history of the CPUs #0 and #1 to outside in response to a request signal from outside.

The input signal NMI represents a non-maskable interrupt request signal. The input signal DBI represents a debug interrupt request signal. The input signal INT represents a maskable interrupt request signal. Each of the CPUs #0 and #1 executes various interrupt processing in response to a request signal input to each of input parts NMI, DBI, and INT, respectively.

When accessing each of external devices gd1 and dg2 coupled to each of the modules m1 to mn or the external bus gb, each of the CPUs #0 and #1 outputs the address of an access destination, a read or write command, and the ID of the CPU #0 or #1 of an access source (CPUID) to the address bus, the command bus, and the CPUID bus of the shared bus b1, respectively, as an access request signal, and further outputs the data to be written to the data bus of the shared bus b1 when the command is a write command.

Each of the CPUs #0 and #1 starts accessing by outputting an access request signal to the shared bus b1 and terminates the access when acquiring a response signal to the access request signal through the shared bus b1.

The shared bus controller 3 may comprise a secondary cache L2. The case where the secondary cache L2 is provided will be described hereinafter.

When receiving an access request signal from the CPU #0 or #1 through the shared bus b1, the shared bus controller 3 accesses the secondary cache L2 and checks if the data to be read is saved in the secondary cache L2. Then, when saved, the shared bus controller 3 outputs the saved data to the CPU #0 or #1 of the access source through the shared bus b1 and at the same time, outputs a response signal to the access request signal through the shared bus b1 when the command of the access request signal is "read", and when the command of the access request signal is "write", the shared bus controller 3 writes data to the L2 cache and at the same time, outputs a response signal to the access request signal through the shared bus b1.

When the target data is not saved in the secondary cache, the shared bus controller 3 outputs the access request signal received through the shared bus b1 to the shared bus b2.

When receiving a response signal and data to be read from each of the modules m1 to mn or the external bus controller 5 from the shared bus b2, the shared bus controller 3 outputs the response signal and the data to be read to the shared bus b1.

When a pseudo response signal, to be described later, is input from the system controller 9 via a dedicated wiring line 12, the shared bus controller 3 outputs the pseudo response signal to the shared bus b1 and causes the CPU #0 or #1 while accessing to receive the signal to terminate the access forcibly. The pseudo response signal is a response signal that the system controller 9 outputs instead when the access destination of the access request signal does not output the response signal.

When receiving an access request signal to its own module through the shared bus b2, each of the modules m1 to mn outputs a response signal to the access request signal to the shared bus b2 and at the same time, outputs a response signal also to the system controller 9 through a dedicated wiring line 11.

The dedicated wiring line 11 comprises, for example, an OR circuit 11*a* and has a configuration in which each response signal output part of each of the modules m1 to mn and the external bus controller 5 is connected by a wiring line to a plurality of input parts of the OR circuit 11*a* and a response signal input part of the system controller 9 is connected by a wiring line to the output part of the OR circuit 11*a*. When a response signal is input to any of the input parts, the OR circuit 11*a* outputs a response signal from its output part.

The external bus controller 5 relays the communication between the external devices gd1 and gd2 coupled to the external bus gb and each of the CPUs #0 and #1.

When various interrupt request signals are input from each of the modules m1 to mn or the external device (not shown), the interrupt controller 7 outputs each of the input signals NMI, DBI, and INT of each of the CPUs #0 and #1 through the system controller 9 and causes each of the CPUs #0 and #1 to execute the various interrupt processing.

The system controller 9 monitors an access request signal in the shared bus b2. Then, the system controller 9 monitors whether or not a response signal to an access request signal is output to the shared bus b2 from the access destination of the access request signal after the access request signal is output from the shared bus controller 3 to the shared bus b2 and before a predetermined time elapses.

Then, when the response signal is not output to the shared bus b2 before the predetermined time elapses, the system controller 9 determines that the shared bus b1 and b2 have hung up due to the occurrence of a bug etc. when the predetermined time elapses (that is, when a timeout occurs), and performs the following processing (1), (2), and (3).

That is, processing (1) outputs a pseudo response signal to the shared bus controller 3, for example, via the dedicated wiring line 12, causes the shared bus controller 3 to output the pseudo response signal to the shared bus b1 and the CPU #0 or #1 of the access source to acquire the signal, and then terminates the access forcibly.

Processing (2) saves at least one of the CPUID, the read or write command, and the address that the CPU #0 or #1 while accessing has output upon the access.

Processing (3) causes the CPUs #0 and #1 to execute various interrupt processing by outputting a signal to the input signals NMI, DBI, and INT of the CPUs #0 and #1. Consequently, it is made possible to infer the position at which a bug has occurred.

When a termination request signal is input from an external device, the system controller 9 outputs a pseudo response signal to the shared bus controller 3 to terminate the access by the CPUs #0 and #1 forcibly even before the predetermined time elapses.

<Configuration of System Controller 9>

Figure 2:
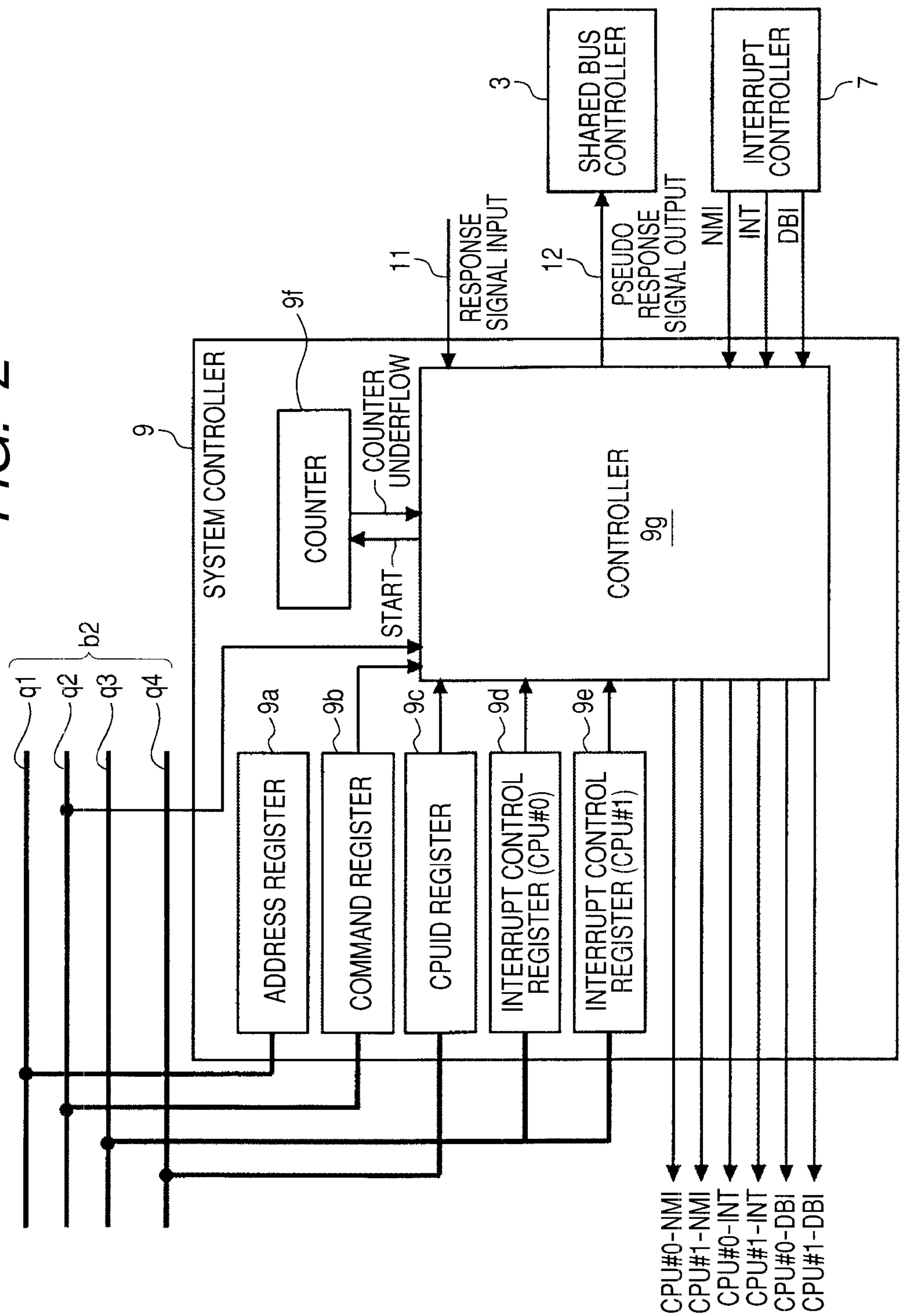
FIG. 2 is a schematic configuration diagram of a system controller 9 in FIG. 1.

As shown in FIG. 2, the system controller 9 comprises an address register 9*a*, a command register 9*b*, a CPUID register 9*c*, interrupt control registers 9*d* and 9*e* provided for each of the CPUs #0 and #1, a counter 9*f*, and a controller 9*g*.

The address register 9*a* is coupled to an address bus q1 of the shared bus b2, the command register 9*b* is coupled to a command bus q2 of the shared bus b2, the CPUID register 9*c* is coupled to a CPUID bus q3 of the shared bus b2, and the interrupt control registers 9*d* and 9*e* are coupled to a data bus q4 of the shared bus b2.

Each of the registers 9*a*, 9*b*, and 9*c* stores the address, command, and CPUID of the access request signal output from the shared bus controller 3 to the shared bus b2 in accordance with the control by the controller 9*f*.

The controller 9*g* monitors whether or not a command (read or write command) of an access request signal is output to the command bus q2 of the shared bus b2. Then, when detecting that a command of an access request signal is output to the command bus q2 of the shared bus b2, the controller 9*g* determines that an access request signal is output from the shared bus controller 3 to the shared bus b2 and causes the counter 9*f* to start timing of a predetermined time.

Then, the controller 9*g* monitors whether or not a response signal is input to the controller 9*g* itself from the access destination of the access request signal (that is, whether or not a response signal to the access request signal is output from the access destination to the shared bus b2) through the dedicated wiring line 11 before the counter 9*f* finishes the timing of the predetermined time.

Then, when a response signal is input to the controller 9*g* itself through the dedicated wiring line 11 before the counter 9*f* finishes the timing of the predetermined time, the controller 9*g* determines that a response signal to the access request signal is output from the access destination to the shared bus b2 (without the occurrence of a bug), and causes the counter 9 to suspend the timing of the predetermined time.

On the other hand, when the counter 9*f* has finished the timing of the predetermined time before a response signal is input to the controller 9*g* itself through the dedicated wiring line 11 (that is, when a timeout has occurred), the controller 9*g* determines that a bug etc. has occurred and the shared buses b1 and b2 have hung up, and performs the following processing (1), (2), and (3).

That is, in the processing (1), the controller 9*g* outputs a pseudo response signal to the shared bus controller 3 through, for example, the dedicated wiring line 12 and causes the shared bus controller 3 to output the pseudo response signal to the shared bus b1 and causes the CPUs #0 and #1 while accessing to acquire it, and then terminates the access forcibly.

In the processing (2), the controller 9*g* acquires the address, the read or write command, and the CPUID of the access request signal from the shared bus b2 and stores them in each of the registers 9*a*, 9*b*, and 9*c*, respectively. The address, the command, and the CPUID stored as above are used to identify which access by which of the CPUs #0 and #1 has occurred a bug.

In the processing (3), the controller 9*g* Outputs the interrupt request signals NMI, DBI, and INT to each of the CPUs #0 and #1 to cause each of the CPUs #0 and #1 to execute various interrupt processing in accordance with the CPUID stored in the CPUID register 9*c* and the setting data stored in advance in the interrupt control registers 9*d* and 9*e*.

By changing the setting data stored in the interrupt control registers 9*d* and 9*e*, it is possible to change the kind of interrupt processing that each of the CPUs #0 and #1 is caused to execute when a bug occurs. The setting data stored in the interrupt control registers 9*d* and 9*e* can be changed by, for example, outputting an interrupt request signal to the input parts NMI, DBI, and INT of the CPU #0 or #1 from outside via the interrupt controller 7 and the system controller 9 and causing the CPU #0 or #1 to execute the interrupt processing.

<Configuration of Controller 9*b*>

FIG. 3 is a diagram showing a logic circuit 10*a* at the part that controls the output of the interrupt request signal NMI of the CPUs #0 and #1 in the controller 9*g*.

The logic circuit 10*a* comprises an OR circuit 13*a*, AND circuits 14*a* and 15*a*, and an output circuit 16.

The output circuit 16 has one input part t1 and two output parts t2 and t3 and to the input part t1, the CPUID (#0 or #1) within the CPUID register 9*c* is input, and when the CPUID is #0, "0" and "1" are output respectively from each of the output parts t2 and t3 and, on the other hand, when the CPUID is #1, "1" and "0" are output respectively from each of the output parts t2 and t3.

The AND circuit 14*a* has one output part t4 and three input parts t5 to t7 and to the input part t5, the bit value ("0" or "1") of a predetermined bit position (for example, b5) within the interrupt control register 9*b* is input and to the input part t6, the output from the output part t2 of the output circuit 16 is input, and to the input part t7, the output of the counter 9*f* is input. The output of the counter 9*f* outputs "0" until the counter 9*f* finishes the timing of the predetermined time and outputs "1" when the counter 9*f* finishes timing of the predetermined time (that is, when a time-out occurs).

The AND circuit 15*a* has one output part t8 and three input parts t9 to t11 and to the input part t9, the bit value ("0" or "1") of a predetermined bit position (for example, b0) within the interrupt control register 9*b* is input and to the input part t10, the output from the output part t3 of the output circuit 16 is input, and to the input part t11, the output of the counter 9*f* is input.

The OR circuit 13*a* has one output part t12 and three input parts t13 to t15 and the output of the output part t12 is output to the input part NMI of the CPU#0 and to each of the input parts t13 and t14, the outputs from the outputs t4 and t8 of the AND circuits 14*a* and 15*a* are input, respectively, and to the input part t15, the non-maskable (NMI) interrupt request signal from the interrupt controller 7 is input (when there is an input of the NMI interrupt request signal, "1" is input and when there is no input of the NMI interrupt request signal, "0" is input).

Similarly, a logic circuit 10*b* at the part that controls the output of the interrupt request signal NMI of the CPU #1 comprises an OR circuit 13*b*, AND circuits 14*b* and 15*b*, and the output circuit 16.

The AND circuit 14*b* has one output part t16 and three input parts t17 to t19 and to the input part t17, the bit value ("0" or "1") of a predetermined bit position (for example, b3) within the interrupt control register 9*e* is input and to the input part t18, the output of the output part t3 of the output circuit 16 is input, and to the output part t19, the output of the counter 9*f* is input.

The AND circuit 15*b* has one output part t20 and three input parts t21 to t23 and to the input part t21, the bit value ("0" or "1") of a predetermined bit position (for example, b0) within the interrupt control register 9*e* is input and to the output part t22, the output of the output part t2 of the output circuit 16 is input, and to the output part t23, the output of the counter 9*f* is input.

The OR circuit 13*b* has one output part t24 and three input parts t25 to t27 and the output of the output part t24 is output to the interrupt request signal NMI of the CPU#1 and to each of the input parts t25 and t26, the outputs of the output parts t16 and t20 of the AND circuits 14*b* and 15*b* are input, respectively, and to the input part t27, the output of the non-maskable (NMI) interrupt request signal from the interrupt controller 7 is input.

Although not shown schematically, the logic circuit at the part that controls the output of the interrupt request signal to the input part INT of the CPU #0 is configured by making the following changes (1a) to (4a) to configure other parts into the same configuration in the logic circuit 10*a*.

(1a) The output of the output part t12 of the OR circuit 13*a* is input to the interrupt request signal INT of the CPU #0.

(2a) To the input part t5 of the AND circuit 14*a*, the bit value of the bit position b4 of the interrupt control register 9*d* is input.

(3a) To the input part t9 of the AND circuit 15*a*, the bit value of the bit position b1 of the interrupt control register 9*d* is input.

(4a) To the input part t15 of the OR circuit 13*a*, the maskable (INT) interrupt request signal from the interrupt controller 7 is input (when there is an input of the INT interrupt request signal, "1" is input and when there is no input of the INT interrupt request signal, "0" is input).

Although not shown schematically, the logic circuit at the part that controls the output of the interrupt request signal to the interrupt request signal INT of the CPU #1 is configured by making the following changes (1b) to (4b) to configure other parts into the same configuration in the logic circuit 10*b*.

(1b) The output of the output part t24 of the OR circuit 13*b* is input to the interrupt request signal INT of the CPU #1.

(2b) To the input part t17 of the AND circuit 14*b*, the bit value of the bit position b4 of the interrupt control register 9*e* is input.

(3b) To the input part t21 of the AND circuit 15*b*, the bit value of the bit position b1 of the interrupt control register 9*e* is input.

(4b) To the input part t27 of the OR circuit 13*b*, the maskable (INT) interrupt request signal from the interrupt controller 7 is input.

Although not shown schematically, the logic circuit at the part that controls the output to the interrupt request signal DBI of the CPU #0 is configured by making the following changes (1c) to (4c) to configure other parts into the same configuration in the logic circuit 10*a*.

(1c) The output of the output part t12 of the OR circuit 13*a* is input to the interrupt request signal DBI of the CPU #0.

(2c) To the input part t5 of the AND circuit 14*a*, the bit value of the bit position b5 of the interrupt control register 9*d* is input.

(3c) To the input part t9 of the AND circuit 15*a*, the bit value of the bit position b2 of the interrupt control register 9*d* is input.

(4c) To the input part t15 of the OR circuit 13*a*, the debug (DBI) interrupt request signal from the interrupt controller 7 is input (when there is an input of the DBI interrupt request signal, "1" is input and when there is no input of the DBI interrupt request signal, "0" is input).

Although not shown schematically, the logic circuit at the part that controls the output to the interrupt request signal DBI of the CPU #1 is configured by making the following changes (1d) to (4d) to configure other parts into the same configuration in the logic circuit 10*b*.

(1d) The output of the output part t24 of the OR circuit 13*b* is input to the interrupt request signal DBI of the CPU #1.

(2d) To the input part t17 of the AND circuit 14*b*, the bit value of the bit position b5 of the interrupt control register 9*e* is input.

(3d) To the input part t21 of the AND circuit 15*b*, the bit value of the bit position b2 of the interrupt control register 9*e* is input.

(4d) To the input part t27 of the OR circuit 13*b*, the debug (DBI) interrupt request signal from the interrupt controller 7 is input.

Each of the AND circuits 14*a*, 15*a*, 14*b*, and 15*b* outputs "1" from its output part only when "1" is input to all of the input parts. Each of the OR circuits 13*a* and 13*b* outputs "1" from its output part only when "1" is input to one or more of the input parts. Each of the CPUs #0 and #1 executes the non-maskable interrupt processing when "1" is input to the interrupt request signal NMI, executes the maskable interrupt processing when "1" is input to the interrupt request signal INT, and executes the debug interrupt processing when "1" is input to the interrupt request signal DBI.

With this configuration, if, for example, the bit values of the bit positions b5 to b3 and b2 to b0 of the interrupt control register 9*d* are set to 001 and 000, respectively, and the bit values of the bit positions b5 to b3 and b2 to b0 of the interrupt control register 9*e* are set to 001 and 000, respectively (mode 1), the operation is as follows. That is, #0 is stored in the CPUID register 9*c* as the CPUID and when the counter 9*f* finishes the timing of the predetermined time and outputs "1", "1" is output only from the output part t24 of the OR circuit 13*b* and the output is input to the interrupt request signal NMI of the CPU #1 and then the non-maskable interrupt processing is executed by the CPU #1. On the other hand, #1 is stored in the CPUID register 9*c* as the CPUID and when the counter 9*f* finishes the timing of the predetermined time and outputs "1", "1" is output only from the output part t12 of the OR circuit 13*a* and the output is input to the interrupt request signal NMI of the CPU #0 and then the non-maskable interrupt processing is executed by the CPU #0.

<Specifications of Interrupt Control Registers 9*d* and 9*e*>

The interrupt control registers 9*d* and 9*e* are configured so as to be able to store 32-bit data as shown in FIG. 4. To the bit positions b31 to b6 of the interrupt control registers 9*d* and 9*e*, for example, zero is set and fixed. Reading (R) from or writing (W) to each of the bit positions b31 to b6 is not available. To the bit positions b5 to b3, any of bit strings 000, 001, 010, and 100 is stored. Reading (R) from and writing (W) to each of the bit positions b5 to b3 are made available.

The interrupt processing to be executed when 000, 001, 010, or 100 is stored in the bit position b5 to b3 and the CPU that executes the interrupt processing are as shown in Function column in FIG. 4. The interrupt processing to be executed when 000, 001, 010, or 100 is stored in the bit position b2 to b0 and the CPU that executes the interrupt processing are also as shown in Function column in FIG. 4.

<Example of Setting Data to Interrupt Control Registers 9*d* and 9*e*>

FIG. 5 shows examples of the bit values (setting data) to be set to each of the bit positions b5 to b3 and b2 to b0 of the interrupt control registers 9*d* and 9*e* and a table of correspondence between the kinds of interrupt processing to be executed for each setting and the CPU that executes the interrupt processing.

In the mode 1, as described above, 001 and 000 are set to each of the bit positions b5 to b3 and b2 to b0 of the interrupt control register 9*d*, respectively, and 001 and 000 are set to the bit positions b5 to b3 and b2 to b0 of the interrupt control register 9*e*, respectively. In this mode, when the counter 9*f* finishes the timing of the predetermined time, the non-maskable interrupt request signal is output only to the CPU #0 in the case of the occurrence during the period of access by the CPU #0 (no interrupt request signal is output to the other CPU #1), and on the other hand, in the case of the occurrence during the period of access by the CPU #1, the non-maskable interrupt request signal is output only to the CPU #1 (no interrupt request signal is output to the other CPU #0).

In the mode 2, 010 and 000 are set to the bit positions b5 to b3 and b2 to b0 of the interrupt control register 9*d*, respectively, and 010 and 000 are set to the bit positions b5 to b3 and b2 to b0 of the interrupt control register 9*e*, respectively. In this mode, when the counter 9*f* finishes the timing of the predetermined time, the maskable interrupt request signal is output only to the CPU #0 in the case of the occurrence during the period of access by the CPU #0 (no interrupt request signal is output to the other CPU #1), and on the other hand, in the case of the occurrence during the period of access by the CPU #1, the maskable interrupt request signal is output only to the CPU #1 (no interrupt request signal is output to the other CPU #0).

In the mode 3, 100 and 000 are set to the bit positions b5 to b3 and b2 to b0 of the interrupt control register 9*d*, respectively, and 100 and 000 are set to the bit positions b5 to b3 and b2 to b0 of the interrupt control register 9*e*, respectively. In this mode, when the counter 9*f* finishes the timing of the predetermined time, the debug interrupt request signal is output only to the CPU #0 in the case of the occurrence during the period of access by the CPU #0 (no interrupt request signal is output to the other CPU #1), and on the other hand, in the case of the occurrence during the period of access by the CPU #1, the debug interrupt request signal is output only to the CPU #1 (no interrupt request signal is output to the other CPU #0).

In the mode 4, 001 and 000 are set to the bit positions b5 to b3 and b2 to b0 of the interrupt control register 9*d*, respectively, and 001 and 000 are set to the bit positions b5 to b3 and b2 to b0 of the interrupt control register 9*e*, respectively. In this mode, when the counter 9*f* finishes the timing of the predetermined time, the non-maskable interrupt request signal is output to all of the CPUs #0 and #1 both in the case of the occurrence during the period of access by the CPU #0 and in the case of the occurrence during the period of access by the CPU #1.

In the mode 5, 010 and 010 are set to the bit positions b5 to b3 and b2 to b0 of the interrupt control register 9*d*, respectively, and 010 and 010 are set to the bit positions b5 to b3 and b2 to b0 of the interrupt control register 9*e*, respectively. In this mode, when the counter 9*f* finishes the timing of the predetermined time, the maskable interrupt request signal is output to all of the CPUs #0 and #1 both in the case of the occurrence during the period of access by the CPU #0 and in the case of the occurrence during the period of access by the CPU #1.

In the mode 6, 100 and 100 are set to the bit positions b5 to b3 and b2 to b0 of the interrupt control register 9*d*, respectively, and 100 and 100 are set to the bit positions b5 to b3 and b2 to b0 of the interrupt control register 9*e*, respectively. In this mode, when the counter 9*f* finishes the timing of the predetermined time, the debug interrupt request signal is output to all of the CPUs #0 and #1 both in the case of the occurrence during the period of access by the CPU #0 and in the case of the occurrence during the period of access by the CPU #1.

In the mode 7, 001 and 010 are set to the bit positions b5 to b3 and b2 to b0 of the interrupt control register 9*d*, respectively, and 001 and 010 are set to the bit positions b5 to b3 and b2 to b0 of the interrupt control register 9*e*, respectively. In this mode, when the counter 9*f* finishes the timing of the predetermined time, the non-maskable interrupt request signal is output to the CPU #0 and the maskable interrupt request signal is output to the other CPU #1 in the case of the occurrence during the period of access by the CPU #0, and on the other hand, in the case of the occurrence during the period of access by the CPU #1, the non-maskable interrupt request signal is output to the CPU #1 and the maskable interrupt request signal is output to the other CPU #0.

In the mode 8, 100 and 010 are set to the bit positions b5 to b3 and b2 to b0 of the interrupt control register 9*d*, respectively, and 100 and 010 are set to the bit positions b5 to b3 and b2 to b0 of the interrupt control register 9*e*, respectively. In this mode, when the counter 9*f* finishes the timing of the predetermined time, the debug interrupt request signal is output to the CPU #0 and the maskable interrupt request signal is output to the other CPU #1 in the case of the occurrence during the period of access by the CPU #0, and on the other hand, in the case of the occurrence during the period of access by the CPU #1, the debug interrupt request signal is output to the CPU #1 and the maskable interrupt request signal is output to the other CPU #0.

<Explanation of Operation of Multi-Core LSI 1>

Figure 6:
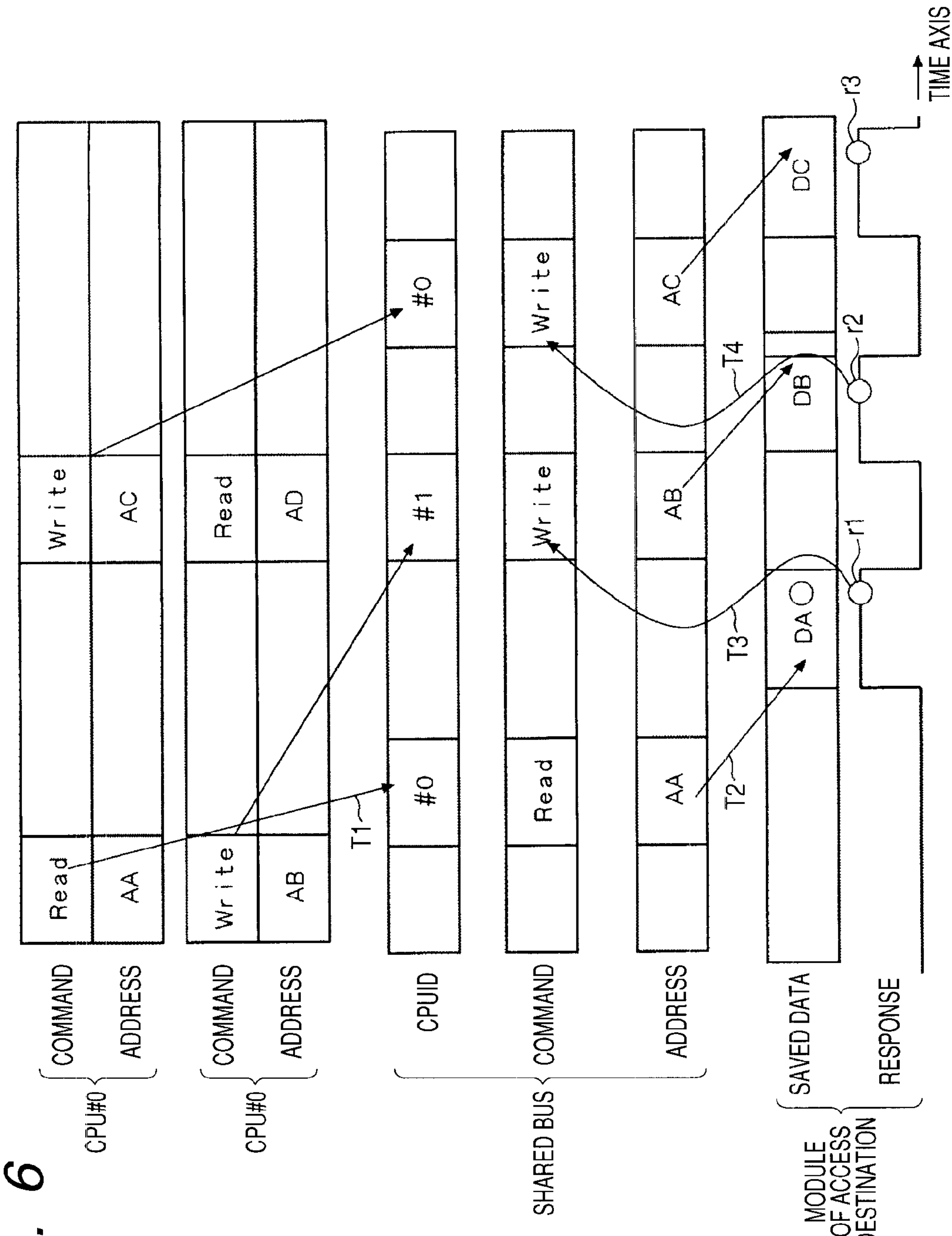
FIG. 6 is a diagram for explaining the outline of the operation when a conventional multi-core LSI is normal.

For reference to understand the characteristics of the present invention, the outline of the operation of a conventional multi-core LSI having, for example, two CPUs #0 and #1 will be described based on FIG. 6 to FIG. 8.

Here, a case will be described, in which processing A by the CPU #0, processing B by the CPU #1, processing C by CPU #0, and processing D by the CPU #1 are performed in this order.

The processing A is processing to read data DA saved in the module of an address AA. The processing B is processing to write data DB in the module of an address AB. The processing C is processing to write data DC in the module of an address AC. The processing D is processing to read data DD saved in the module of an address AD.

First, the operation in the normal state will be described based on FIG. 6. The processing A is first executed by the CPU #0. That is, #0 as the CPUID, a read command as the command, and AA as the address are output from the CPU #0 to the shared bus as an access request signal (T1 in FIG. 6). Then, when the access request signal is acquired by the module of the address AA (T2 in FIG. 6), the data DA to be read and a response signal r1 to the access request signal are output from the module to the shared bus (T3 in FIG. 6) and when the response signal r1 is acquired by the CPU #0 along with the data DA, the processing A is completed and the next processing B is executed by the CPU #1 in a similar manner. Then, when a response signal r2 to the access request signal of the processing B is output from the module of the address AB (T4 in FIG. 6), the processing B is completed and the next processing C is executed in a similar manner and when a response signal r3 to an access request signal a3 of the processing C is output, the processing C is completed and the next processing D is executed in a similar manner (refer to FIG. 8(*a*)).

Figure 7:
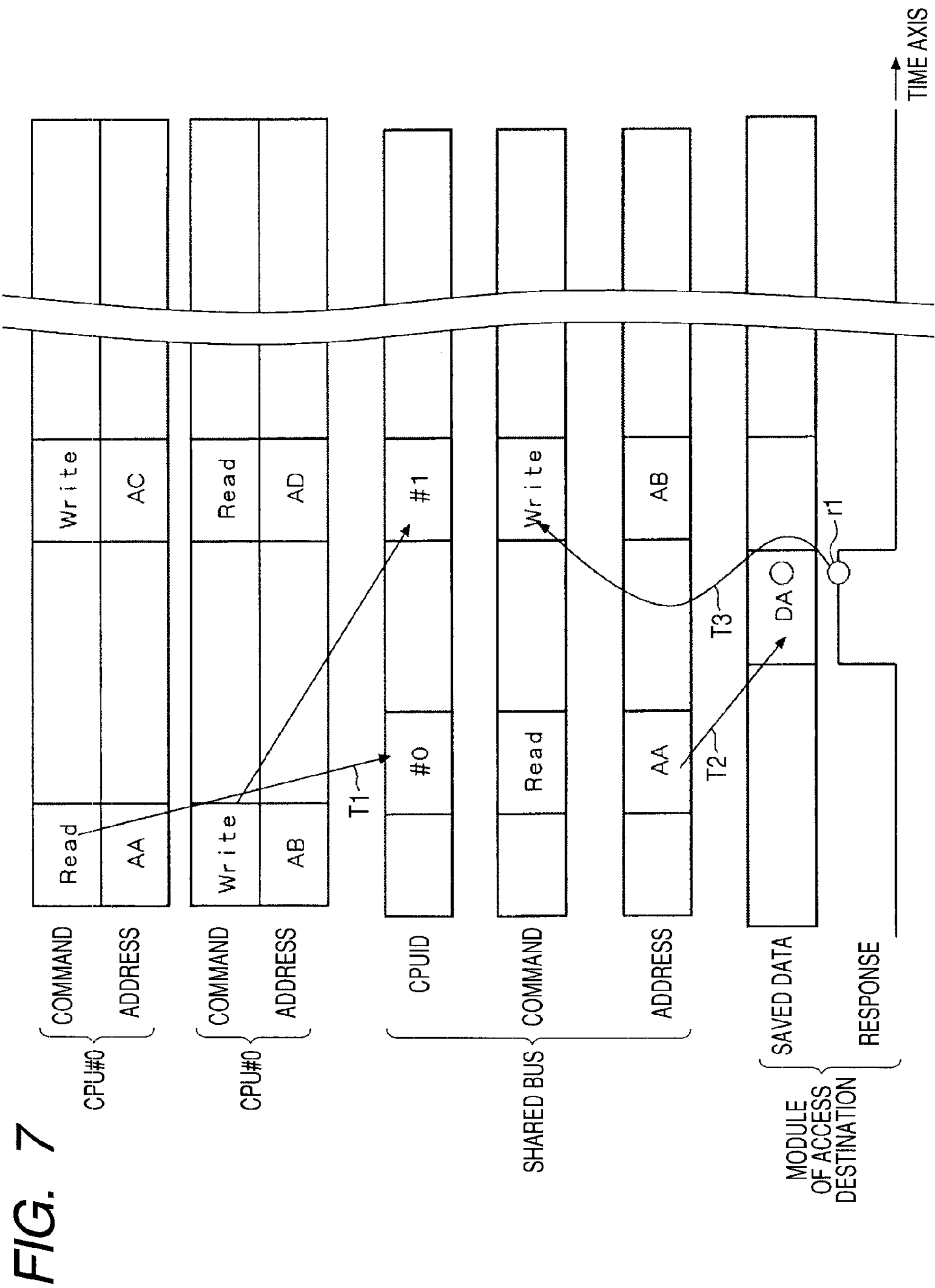
FIG. 7 is a diagram for explaining the outline of the operation when a timeout occurs (when a bug occurs) in the conventional multi-core LSI.
Figure 8A:
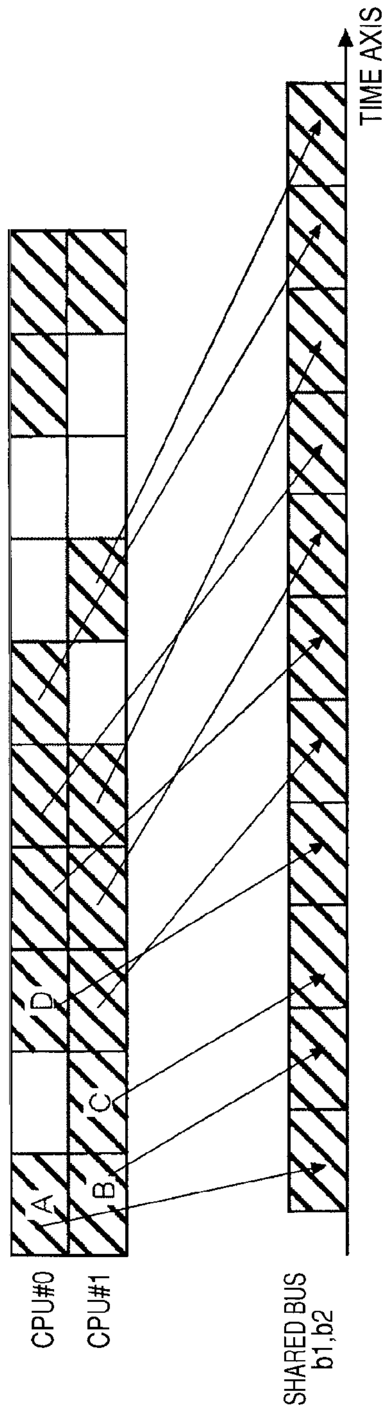
FIG. 8 is another diagram for explaining the outline of the operation when the conventional multi-core LSI is normal and when a timeout occurs.
Figure 8B:
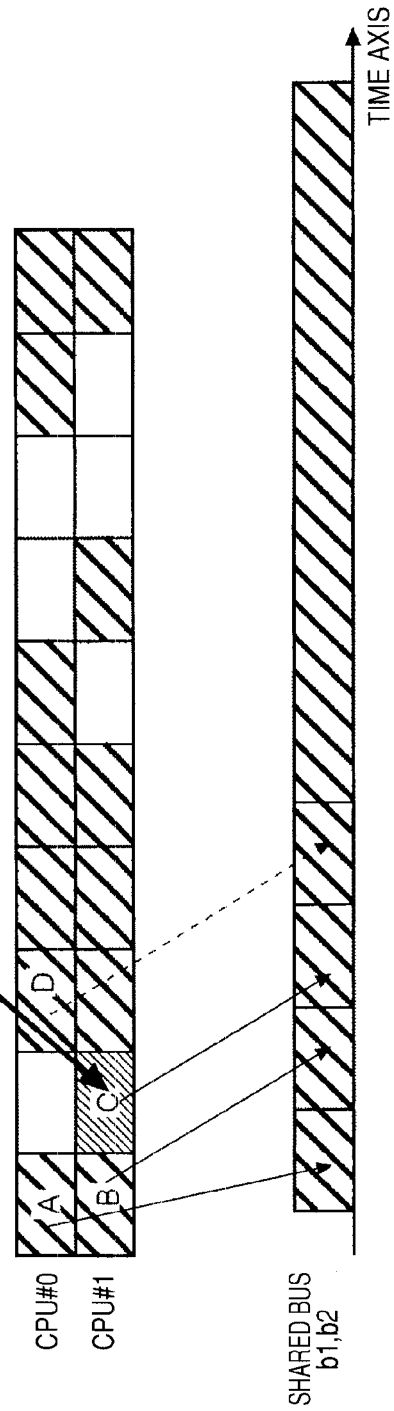

With such a conventional multi-core LSI, in the case where, for example, the processing B is executed by the CPU #1, if the response signal r2 to the access request signal is not output because of a bug etc. from the module to be accessed, the processing B cannot be completed and therefore the next processing C cannot be executed and the operation stops as shown in FIG. 7 and FIG. 8(*b*). As described above, if no response signal is output from the access destination because processing with a bug is executed, the CPU (for example, #1) that has executed the processing will occupy the shared bus for a long period of time, and therefore, the other CPU with no problem (for example, #0) cannot execute the next processing and the operation of the multi-core LSI stops.

With the conventional multi-core LSI, if the operation stops as described above, it is difficult to identify which access by which of the CPUs #0 and #1 has caused the operation to stop (that is, in which a bug has occurred) because there is a plurality of CPUs, despite as is easy in the case of a single-core LSI.

Next, the operation of the multi-core LSI 1 according to the present embodiment will be described based on FIG. 1 and FIG. 9.

In the same manner as described above, a case will be described, where the processing A by the CPU #0, the processing B by the CPU #1, the processing C by the CPU #0, and the processing D by the CPU #1 are executed in this order. The content of each of the processing A, B, C, and D is the same as that described above.

First, the processing A is executed by the CPU #0. That is, #0 as the CPUID, a read command as the command, and AA as the address are output from the CPU #0 to the shared bus b1 as an access request signal (S1 in FIG. 9).

Then, the access request signal output to the shared bus b1 is acquired by the shared bus controller 3 and output to the shared bus b2. Then, the access request signal output to the shared bus b2 is acquired by the module (for example, m1) of the address AA and at the same time, the command (read) is acquired by the system controller 9. Then, in the system controller 9, triggered by the acquisition of the command, the timing of the predetermined time by the counter 9*f* is started (here, from 15 to 0 is timed) (S2 in FIG. 9).

Figure 9:
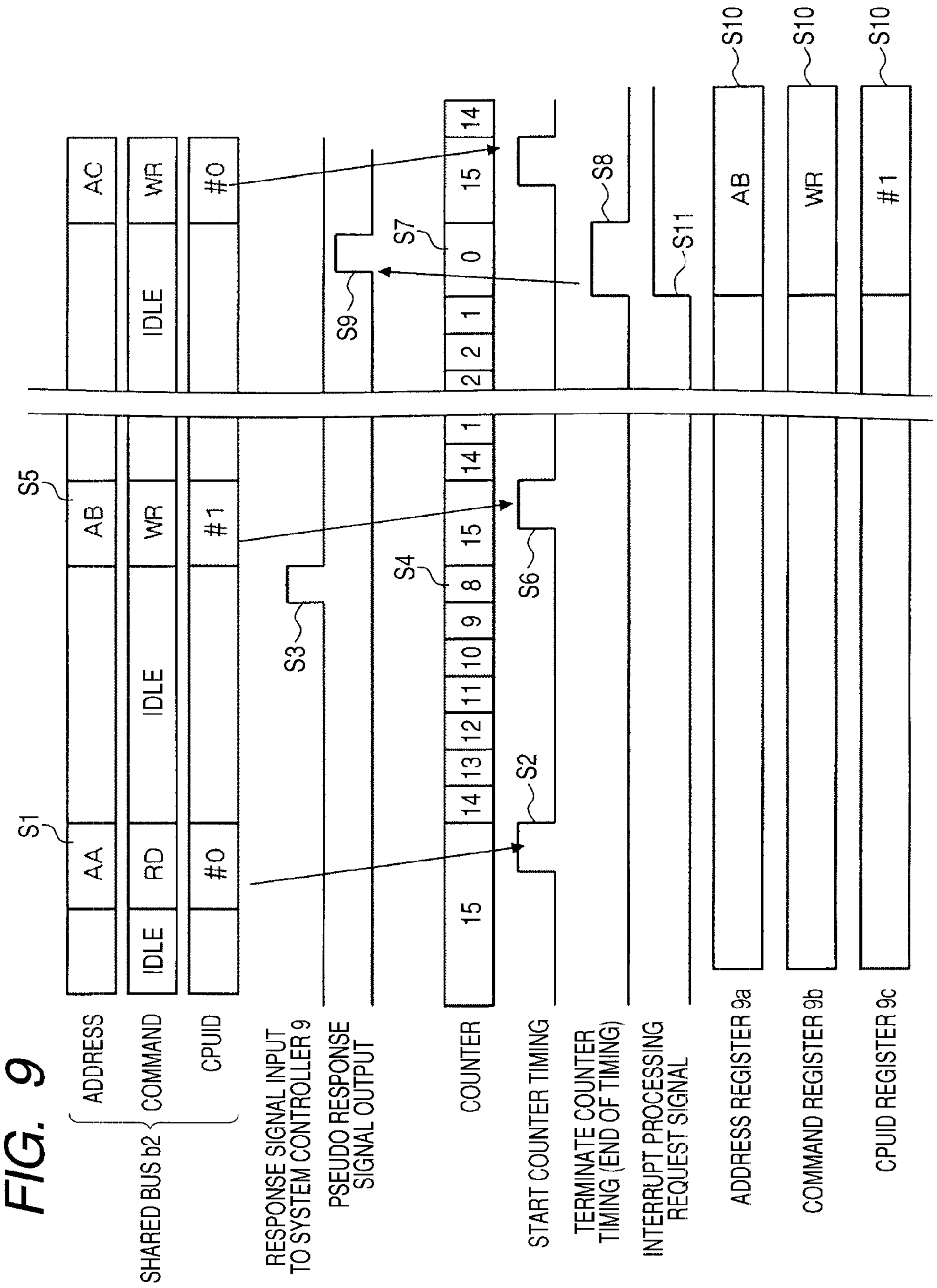
FIG. 9 is a diagram for explaining the operation of the multi-core LSI according to the first embodiment.

Then, before the counter 9*f* finishes the timing of the predetermined time, if a response signal to the access request signal and the data DA to be read are output from the module m1 of the address AA to the shared bus b2 and at the same time, the response signal is output to the system controller 9 via the dedicates wiring line 11 (S3 in FIG. 9), the system controller 9 to which the response signal is input determines that the shared buses b1 and b2 have not hung up due to a bug etc. and the timing of the predetermined time by the counter 9*f* is suspended (S4 in FIG. 9).

The response signal and the data DA output from the module m1 of the address AA to the shared bus b2 are acquired by the shared bus controller 3 and output to the shared bus b1, and acquired by the CPU #0 while accessing and then the processing A is completed.

Then, the next processing B is executed by the CPU #1. That is, in a similar manner to that of the processing A, an access request signal is output from the CPU #1 to the shared bus b1 (S5 in FIG. 9). The access request signal is acquired by the shared bus controller 3 and output to the shared bus b2, and acquired by the module (for example, m2) of the address AB and at the same time, the command (write) is acquired by the system controller 9. Then, in the system controller 9, triggered by the acquisition of the command described above, the timing of the predetermined time by the counter 9*f* is started (S6 in FIG. 9).

Then, if the counter 9*f* finishes the timing of the predetermined time before a response signal to the access request signal and the data DA to be read are output from the module m2 of the address AB to the shared bus b2 and at the same time, the response signal is output to the system controller 9 via the dedicated wiring line 11 (S7 in FIG. 9), a signal to that effect (a timeout signal) is output from the counter 9*g* (S8 in FIG. 9) and based on the output, the system controller 9 determines that the shared buses b1 and b2 have hung up because there occurs a bug etc.

Triggered by this determination, a pseudo response signal is output from the system controller 9 to the shared bus controller 3 via, for example, the dedicated wiring line 12 (S9 in FIG. 9), the pseudo response signal is output from the shared bus controller 3 to the shared bus b1 and acquired by the CPU #1 while accessing and thus the processing B is terminated forcibly. Then, the next processing C is executed by the CPU #0 (S12 in FIG. 9).

Also triggered by the above determination, the address (AB), the command (write), and the CPUID (#1) of the access request signal are acquired by the system controller 9 from the shared bus b2 and stored in each of the registers 9*a*, 9*b*, and 9*c* of the system controller 9, respectively (S10 in FIG. 9).

Then, the system controller 9 outputs an interrupt request signal to the interrupt input signals NMI, DBI, and INT of each of the CPUs #0 and #1 in accordance with the CPUID stored in the CPUID register 9 and the setting data stored in advance in the interrupt control registers 9*d* and 9*e* (S11 in FIG. 9). Then, triggered by this interrupt request signal, various interrupt processing is executed by the CPUs #0 and #1. Then, in a similar manner, the next processing C and D are executed sequentially.

As described above, with the multi-core LSI 1 according to the present embodiment, in comparison to the conventional multi-core LSI, if a response signal to the access request signal is not output from the module to be accessed after the access request signal is output to the shared bus b2 and before a predetermined time elapses, a pseudo response signal is output from the system controller 9 and triggered by the pseudo response signal, the access by the CPUs #0 and #1 while accessing is terminated forcibly and the next processing is executed, and therefore, it is possible to prevent the operation of the multi-core LSI 1 from stopping.

In addition to the pseudo response signal, request signals of various interrupt processing are output to the CPUs #0 and #1 from the system controller 9, and therefore, it is possible to identify which access by which of the CPUs #0 and #1 has caused a hang-up when the shared buses b1 and b2 have hung up due to the occurrence of a bug etc. by confirming the point at which the interrupt processing by the CPU #0 or #1 is executed.

<Main Effects>

According to the multi-core LSI 1 configured as described above, the system controller 9 outputs a pseudo response signal to the shared bus b1 via the shared bus controller 3 and terminates the access by the CPU #0 or #1 while accessing if a response signal is not output from the modules m1 to mn of the access destination or from the external bus controller 9 after an access request signal is output from the shared bus controller 3 to the shared bus b2 and before a predetermined time elapses. Consequently, it is possible to prevent the CPU

0 or #1 while accessing from occupying the shared buses b1 and b2 for a long period of time and thereby the operation of the multi-core LSI 1 from stopping even if a response signal is not output from the module to be accessed because of the occurrence of a bug etc, and therefore, the stability of the operation of the multi-core LSI can be improved.

Further, the system controller 9 causes the CPU #0 or #1 while accessing to execute an interrupt processing if a response signal is not output from the modules m1 to mn to be accessed or the external bus controller 9 after an access request signal is output from the shared bus controller 3 to the shared bus b2 and before a predetermined time elapses. As a result, it is possible to identify which access by which of the CPUs #0 and #1 has caused a hang-up when the shared buses b1 and b2 have hung up due to the occurrence of a bug etc. by confirming the point at which the interrupt processing by the CPU #0 or #1 is executed, and the efficiency of program development can be improved.

Furthermore, the system controller 9 causes the CPU #0 or #1 while accessing to execute the non-maskable interrupt processing, the maskable interrupt processing, or the debug interrupt processing as an interrupt processing. As a result, it is possible to set priority of interrupt processing according to the kind of interrupt processing.

The system controller 9 causes all of the CPUs #0 and #1 to execute an interrupt processing if a response signal is not output from the modules m1 to mn to be accessed or the external bus controller 9 after an access request signal is output from the shared bus controller 3 to the shared bus b2 and before a predetermined time elapses. As a result, it is possible to more easily identify which access by which of the CPUs #0 and #1 has caused a hang-up when the shared buses b1 and b2 have hung up due to the occurrence of a bug etc. by confirming the point at which the interrupt processing is performed not only by the CPU encountered with the occurrence of a bug but also by the normal CPU, and then the efficiency of program development can be improved.

It may also be possible to set so that the system controller 9 causes the CPU #0 or #1 while accessing to execute the non-maskable interrupt processing as the above-mentioned interrupt processing and causes the other CPU #0 or #1 to execute the maskable interrupt processing. As a result, it is possible to change the priority of interrupt processing in accordance with the CPU encountered with the occurrence of a bug or the normal CPU.

It may also be possible to set so that the system controller 9 causes the CPU #0 or #1 while accessing to execute the debug interrupt processing as the above-mentioned interrupt processing and causes the other CPU #0 or #1 to execute the maskable interrupt processing. As a result, it is possible to change the priority of interrupt processing in accordance with the CPU encountered with the occurrence of a bug or the normal CPU.

Further, the system controller 9 saves at least one of the CPUID, the read/write command, and the address (in the description of the operation, the case is described, where all of the three are saved) that the CPU #0 or #1 while accessing has output at the time of its accessing, if a response signal is not output from the modules m1 to mn to be accessed or the external bus controller 5 after an access request signal is output from the shared bus controller 3 to the shared bus b2 and before a predetermined time elapses. As a result, it is possible to more easily identify which access by which of the CPUs #0 and #1 has caused the occurrence of a bug etc. when the shared buses b1 and b2 have hung up due to the occurrence of a bug etc. based on the saved CPUID, command, or address, and then the efficiency of program development can be improved.

When receiving a termination request signal from a predetermined external device, the system controller 9 terminates the access by the CPU #0 or #1 while accessing by outputting a pseudo response signal to the shared bus b1 via the shared bus controller 3 even before the predetermined time by the counter 9*f* elapses. As a result, it is possible to forcibly terminate the access by the CPU #0 or #1 while accessing even before the predetermined time elapses upon receipt of a termination request signal from a predetermined external device.

Second Embodiment

The above-mentioned configuration of the multi-core LSI is also effective when the shared buses b1 and b2 have a bus configuration of packet transaction or split transaction.

In these bus configurations, when, for example, accessing a memory etc. via the shared bus b1, the CPU #0 preserves the bus right of the shared bus b1 when issuing an access command to the memory and then issues the access command and releases once the bus right of the shared bus b1. Consequently, it is possible for the other CPU #1 to access the shared bus b1 after the bus right is released.

In this case, it is possible for the CPU #1 to access the shared buses b1 and b2 even if the access by the CPU #0 to the memory is an unauthorized access and the above-mentioned shared bus b1 or b2 is caused to hang up. In such a case, however, if the configuration is, for example, a symmetric multi processing (SMP) configuration, the CPU #0 is in the suspended state of awaiting a response from the memory, and therefore, the processing by the CPU #0 is not completed and the processing executed by the CPU #1 is also affected.

When the system controller 9 issues a pseudo response signal to the memory access by the CPU #0, the CPU #0 restores from the suspended state and it is made possible for the CPU #0 to specify a correct address to issue again a memory access and thereby the entire system of the multi-core LSI can be maintained in the stable state. Further, the frequent occurrence of such an unauthorized memory access can be made clear from the saved CPUID, command, or address, and therefore, it is possible to more clearly specify which access by which of the CPUs #0 and #1 has caused the occurrence of a bug etc., and thus, the efficiency of program development can be improved.

The present invention can be used for a multi-core LSI on which a plurality of CPUs is mounted on the same LSI and effective not only at the time of debugging by a debugger but also at the time of the normal operation.

What is claimed is:

1. A data processing device on one semiconductor substrate, the device comprising:

- a plurality of central processing units coupled with a first bus;
- one or more peripheral modules coupled with a second bus;
- a system controller; and
- a bus controller,
- wherein the bus controller determines one of said plurality of central processing units which issues a bus request, and
- wherein the system controller issues a first signal to said one central processing unit which has issued an access request and is awaiting an acknowledge signal of said one or more peripheral modules, and to another central processing unit which did not issue the access request, when one of said peripheral modules has not output an acknowledge signal in response to the bus request from the one central processing unit in a predetermined time, or when the system controller receives a second signal from a device coupled to the data processing device from outside said device before a predetermined time elapses.

2. A data processing device according to claim 1, wherein the system controller stores a CPU ID of said one central processing unit to a register in response to issuance of the first signal.

3. A data processing device according to claim 2, further comprising:

a second bus controller, wherein the second bus controller translates signals between the system controller and the device coupled from outside of the data processing device.

4. A data processing device according to claim 3, further comprising:

an interrupt controller which issues an interrupt signal to one of the central processing units in accordance with issuance of the first signal.

* * * * *

UNITED STATES PATENT AND TRADEMARK OFFICE

CERTIFICATE OF CORRECTION

PATENT NO. : 8,108,586 B2
APPLICATION NO. : 12/985227
DATED : January 31, 2012
INVENTOR(S) : Mamoru Sakugawa It is certified that error appears in the above-identified patent and that said Letters Patent is hereby corrected as shown below:

On the Title Page:

Add Item (30) as follows:

(30) Foreign Application Priority Data

February 14, 2008 (JP) ...................................2008-33030

Signed and Sealed this
Thirteenth Day of March, 2012

David J. Kappos
*Director of the United States Patent and Trademark Office*